(12) United States Patent
Burrows

(10) Patent No.: US 7,512,976 B2
(45) Date of Patent: Mar. 31, 2009

(54) METHOD AND APPARATUS FOR XSL/XML BASED AUTHORIZATION RULES POLICY IMPLEMENTATION

(75) Inventor: Warwick Leslie Burrows, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 10/703,014

(22) Filed: Nov. 6, 2003

(65) Prior Publication Data

US 2005/0102530 A1    May 12, 2005

(51) Int. Cl.
 G06F 12/14    (2006.01)
 G06F 7/00    (2006.01)
 H04L 9/00    (2006.01)
(52) U.S. Cl. .................... 726/20; 713/155; 713/167; 713/170; 713/189; 380/44; 380/286; 707/9; 707/100; 707/102
(58) Field of Classification Search ............. None
 See application file for complete search history.

(56) References Cited

U.S. PATENT DOCUMENTS

| | | | |
|---|---|---|---|
| 6,519,617 B1 * | 2/2003 | Wanderski et al. ......... 715/513 |
| 6,647,388 B2 * | 11/2003 | Numao et al. ................ 707/9 |
| 6,675,261 B2 * | 1/2004 | Shandony ................. 711/121 |
| 6,704,723 B1 * | 3/2004 | Alavi et al. ................. 707/3 |
| 6,725,231 B2 * | 4/2004 | Hu et al. .................. 707/102 |
| 6,782,379 B2 * | 8/2004 | Lee ............................ 707/2 |
| 6,816,871 B2 * | 11/2004 | Lee ........................ 707/104.1 |
| 6,931,532 B1 * | 8/2005 | Davis et al. ............... 713/167 |
| 6,941,459 B1 * | 9/2005 | Hind et al. ................ 713/167 |
| 6,959,415 B1 * | 10/2005 | Soderberg et al. .......... 715/513 |
| 6,961,849 B1 * | 11/2005 | Davis et al. ............... 713/167 |
| 6,978,367 B1 * | 12/2005 | Hind et al. ................ 713/167 |
| 7,143,190 B2 * | 11/2006 | Christensen et al. ....... 709/246 |
| 7,146,614 B1 * | 12/2006 | Nikols et al. .............. 719/313 |
| 7,188,158 B1 * | 3/2007 | Stanton et al. ............ 709/220 |
| 2001/0023421 A1 * | 9/2001 | Numao et al. ................ 707/9 |
| 2002/0103881 A1 * | 8/2002 | Granade et al. ........... 709/218 |
| 2004/0019630 A1 * | 1/2004 | Burbeck et al. ........... 709/203 |

OTHER PUBLICATIONS http://www.fawcette.com/javapro/2003_08/online/yboglaev_08_08_03/default_pf.asp, "Event Triggering XSLT Magic", Java Pro—Event Triggering XLST Magic, Aug. 14, 2003, pp. 1-3.

(Continued)

*Primary Examiner*—Kaveh Abrishamkar
(74) *Attorney, Agent, or Firm*—Duke W. Yee; Libby Z. Handelsman; Wayne P. Bailey

(57) ABSTRACT

A system and method for implementing XSL/XML based authorization rules policy on a given set of data. An authorization rules engine is created which uses authorization rules defined in XSL to operate on access decision information (ADI) provided by the user. Inside the authorization rules engine, a boolean authorization rules mechanism is implemented to constrain the XSL processor to arrive at a boolean authorization decision. By applying the constrained authorization rules, the authorization rules engine evaluates available ADI data from an ADI XML input document. An output from a set of predetermined authorization decisions is provided to the user when the ADI input data is successfully evaluated. An error message is also provided to the user if required ADI data is unavailable for evaluation.

20 Claims, 5 Drawing Sheets

OTHER PUBLICATIONS http://www.fawcette.com/javapro/2003_08/online/xml_yboglaev_08_01_03/default_pf.asp, "A Design Pattern for a Rule Engine", Java Pro—A Design Pattern for a Rule Engine, Aug. 14, 2003, pp. 1-3.

* cited by examiner

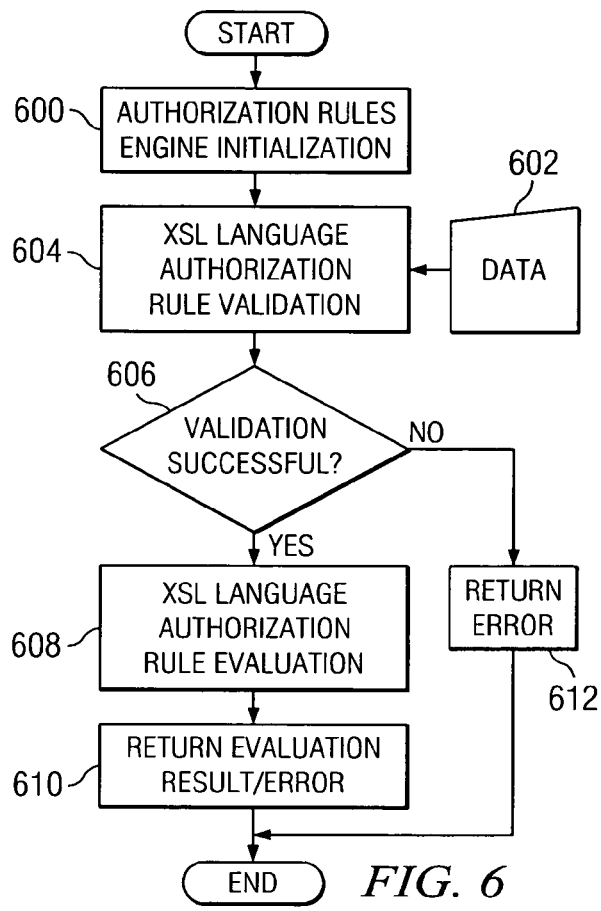
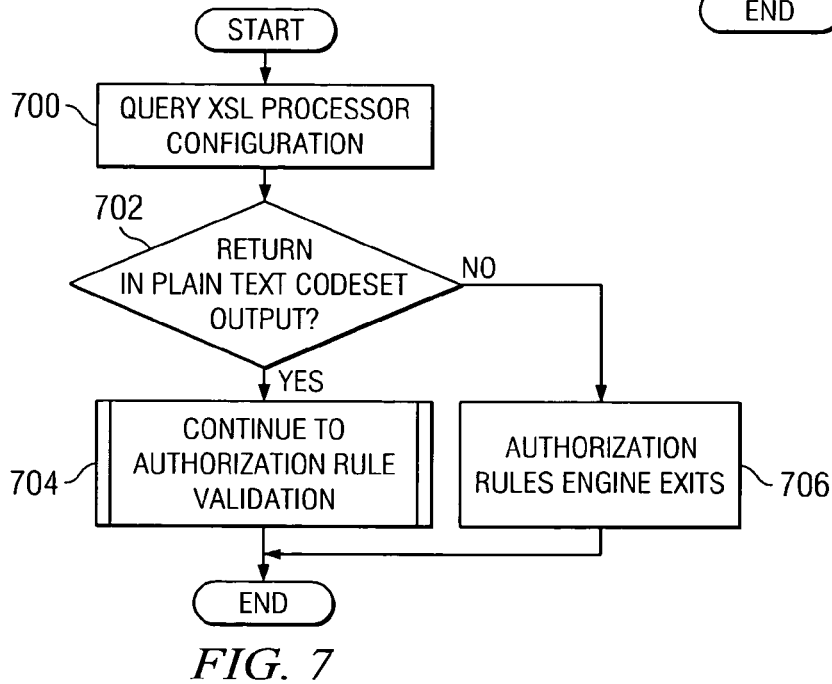
FIG. 6
FIG. 7

METHOD AND APPARATUS FOR XSL/XML BASED AUTHORIZATION RULES POLICY IMPLEMENTATION

BACKGROUND OF THE INVENTION

1. Technical Field

The present invention relates generally to an improved data processing system and more particularly the present invention provides a method, apparatus, and computer instructions for implementing XSL/XML based authorization rules policy on a given set of data.

2. Description of Related Art

In recent years, the popularity of consumers using the Internet to buy and sell products and services has increased. This popularity enhances the opportunity for companies to provide a variety of goods and services to both the consumers and to each other. As the demand for performing transactions online grows, a need exists for a common language or syntax that allows businesses to exchange data across the Internet, so that they can take advantage of the opportunity to provide their goods and services. This need becomes the reason behind the emergence of extensible markup language (XML).

Unlike hypertext markup language (HTML), which defines a set of specific tags for formatting and displaying data, XML allows users to customize the tags specific for an application that represents the contextual meaning of the data. Hence, XML enables businesses to exchange structured common data freely across the Internet without restriction of the browser. Since XML is a standard maintained by the World Wide Web Consortium (W3C), a new business or entity may implement XML easily by referring to the latest specification. Although XML provides the capability to exchange data freely across the Internet, XML also restricts the users to agree on the same schema or data type definition (DTD). This restriction becomes a problem especially for users who do not exchange data very often. Therefore, a new standard proposed by W3C has been established to convert XML documents that conform to one schema into documents that conform to other schemas, making information much easier to pass back and forth between different systems. This new standard is called extensible stylesheet language (XSL).

XSL consists of three parts: (1) extensible stylesheet language translation (XSLT), a language for transforming XML documents; (2) XPath, a language for defining parts of an XML document; and (3) XSL formatting objects, a vocabulary for formatting XML documents. XSLT is a language that allows the user to convert XML documents into other XML documents, HTML documents, or plain text files. By using a stylesheet in XSLT, users specify changes they would like to make to the XML document by using specialized XML elements and attributes. This feature allows users to delete, rename, and reorder any components of the input XML document to generate an output document with the desired format. Another aspect of XSL is XPath, which allows users to specify the path through the XML document tree from one part to another. XPath provides a functionality to obtain a specific element or attribute names and values in an XML document. XPath defines pattern matching to find an element or attributes with a specific parent or child. XPath also defines addressing for elements relative to the root of the document (absolute path) or to the current element (relative path).

With the help of XML and XSL, data exchange between businesses across the Internet becomes a reality. However, the user community raises concerns over security of such data exchange. Particularly, security of accessing resources that are meant to be protected is of concern. These resources include, for example, personal credit card information, social security numbers, and passwords. One mechanism used to meet these concerns is by a method called authorization rule policy.

An authorization rule policy is used to control access to protected resources. The policy consists of two parts: (1) role-based access control that assigns rights according to the user roles and (2) instance-based extensions that utilize authorization rules that evaluate external access decision information (ADI).

In most applications, the authorization rule policy, syntax, and data is proprietary to a specific implementation. The administrator has to understand the syntax and the limitations of the variables of the implementation. Moreover, the implementation is not easily adapted to Web applications where XML is employed. When confronted with XML standard-based applications, such as ebXML, LegalXML, XACML, communications protocol messages SOAP, or XML based assertion or identity or authority SAML, the existing rule implementation is limited to conditions where the rules engine must know or understand these formats in order to manipulate the data. This limitation of implementation imposes rules of translation upon the incoming data, which can be proprietary and intolerant to the data format or protocol.

Therefore, when new data format is released, the new data format has to be considered. This type of catering is a cumbersome task for users to maintain. Therefore, it would be advantageous to have an improved method, apparatus, and computer instructions for implementing the authorization rule policy that is more flexible in adapting to new applications that employ XML data, formats, and protocols.

SUMMARY OF THE INVENTION

The present invention provides a method, apparatus, and computer instructions for implementing XML/XSL based authorization rules policy on a given set of data. The authorization rules engine of the present invention implements a XSL/XML authorization rule model called ADI XML document model. Constraints are first placed upon the format and functionality of the XSL authorization rule written by the user. The authorization rules engine then builds an ADI XML input document from available ADI data and evaluates the ADI data based upon the authorization rule. The result of the evaluation is returned to the user from a set of predetermined authorization decisions. An error message is returned if the required ADI data is unavailable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart of a process for implementing an XSL/XML based authorization rules policy on a given set of data in accordance with a preferred embodiment of the present invention;

FIG. 7 is a flowchart of a process for initializing the authorization rules engine in accordance with a preferred embodiment of the present invention;

DETAILED DESCRIPTION OF THE PREFERRED EMBODIMENT

Figure 1:
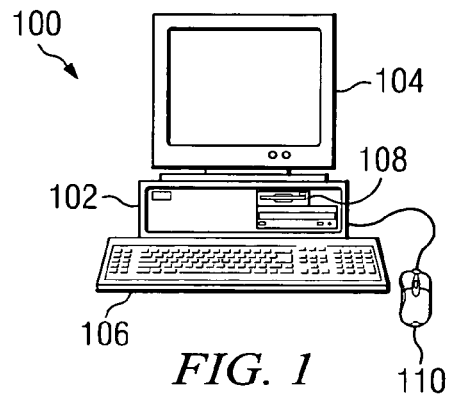
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
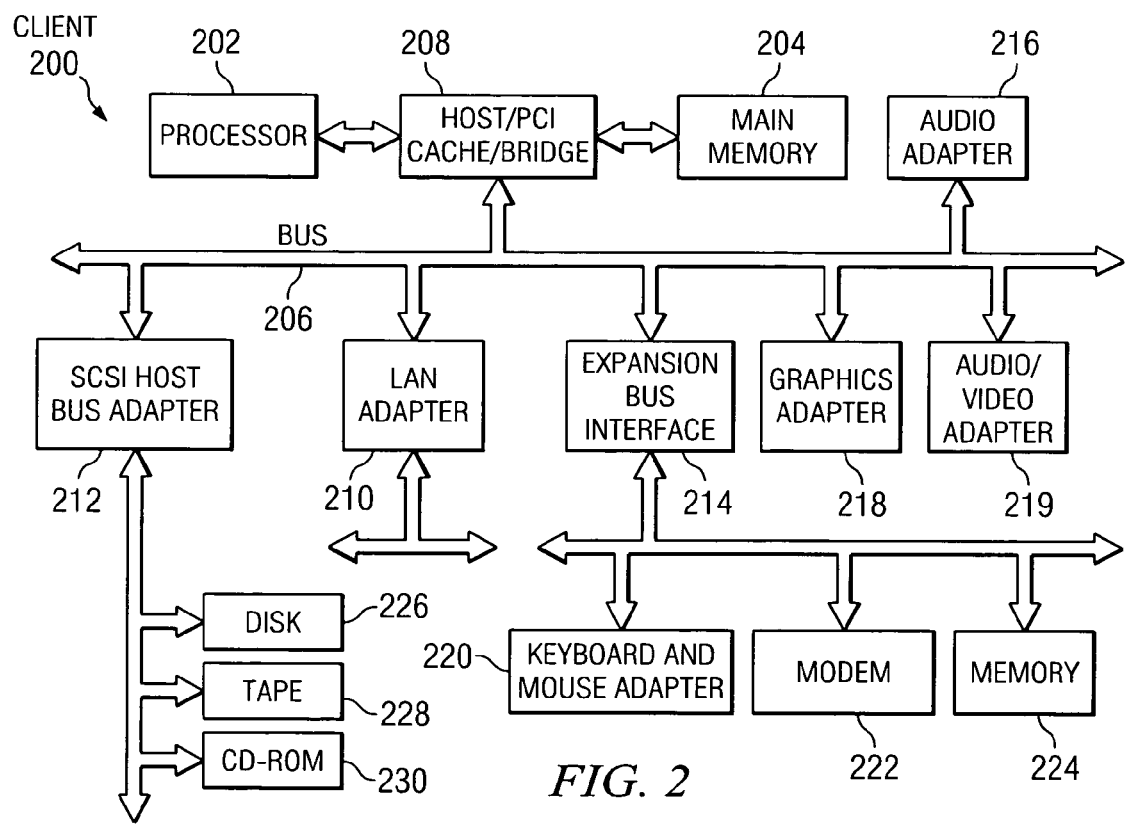
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer instructions for implementing extensible stylesheet/extensible markup language (XSL/XML) based authorization rules policy on a given set of data input from the user application, such as IBM Tivoli Access Manager for e-business, IBM WebSphere and WebSphere Solutions Integration, a product available from International Business Machines (IBM) Corporation.

The mechanism of the present invention allows users to submit attribute-based data in different formats to the authorization rules engine for evaluation. These formats may be, for example, XML, string, or unsigned long formats. Currently, a user may use the Access Manager application programming interface (API) to input access decision information (ADI) attribute values. These values, however, may not be in the XML format.

One mechanism of the present invention takes the input values in legacy formats such as a string or unsigned long and converts the values into XML format. This conversion is achieved in the examples by employing an XSL/XML based authorization rule model called the ADI XML document model. The ADI XML document model of the present invention defines an XML document to wholly contain the ADI XML data that will be used for evaluation. If the input value is not in XML format, the value is formatted as an XML data object automatically by an authorization rules engine and inserted into the ADI XML input document. This mechanism of the present invention is well suited to any authorization task that involves XML format data or protocols. Moreover, this mechanism also may perform the conversion of input values from other resources, such as a third party entitlement service or a plug-in interface that is generated by the user.

In addition, the ADI XML document model used in the illustrative embodiments of the present invention imposes constraints on the format of the XSL language rules provided by the user. One mechanism of the ADI XML document model takes advantage of the XSL processor functionality and implements boolean authorization rules to constrain the XSL language rules in order to arrive at a boolean authorization decision. The mechanism of the present invention may be implemented using a generic off-the-shelf XSL processor and including processes to form a rules processor that constrains XSL rules defined by the user and transforms the ADI XML input document to return a predetermined authorization decision result to the calling application. This mechanism also operates within the confines of an ADI XML input document which is built by the authorization rules engine at the time the authorization rule is evaluated.

The mechanism of the present invention also identifies the ADI data that a particular authorization rule requires for the authorization rule to be evaluated correctly. In the depicted examples, the identification is performed when the authorization rule is compiled into the XSL processor's compiled rule format. The compilation of the authorization rule produces a compiled rule object, which is stored in a compiled rule cache of the authorization rules engine. The compiled rule object contains a list of ADI data required for a particular authorization rule and is presented to the authorization rules engine when the authorization rule is evaluated.

In addition, the above described mechanism gathers the list of ADI data required before the evaluation of the authorization rule takes place. The gathering of the ADI data is performed by searching for the missing ADI data from sources, such as, for example, one of the following places: the application context passed in by the requesting entity, the credential attributes of the user, the context of the authorization rules engine itself, or an external source by using an API. If any of the required ADI data is not available at the time ADI data is gathered, an error message is returned to the user by the authorization rules engine.

Figure 3:
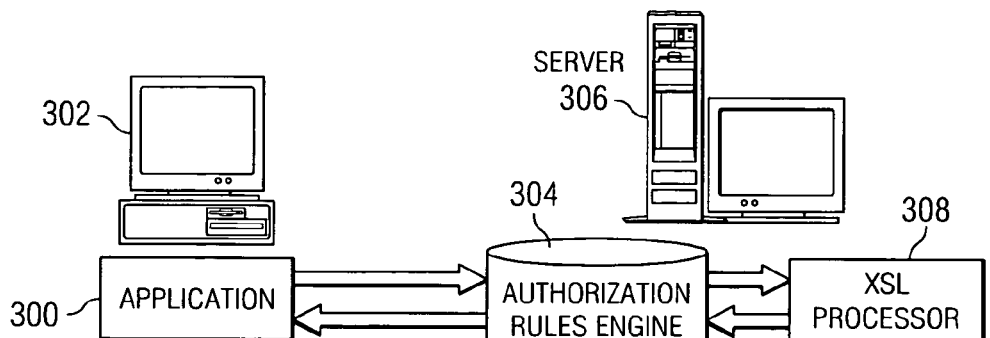
FIG. 3 is a diagram illustrating components used in implementing an XSL/XML based authorization rules policy on a given set of data in accordance with a preferred embodiment of the present invention.

Turning now to FIG. 3, a diagram illustrating components used in implementing an XSL/XML based authorization rules policy on a given set of data is depicted in accordance with a preferred embodiment of the present invention. As depicted in FIG. 3, in this example implementation, a user runs application 300 on data processing system 302. When the user defines the authorization rule in the XSL format in application 300, the authorization rule is presented to authorization rules engine 304 on server 306 to be validated. Server 306 may be implemented using data processing system 200 in FIG. 2.

Upon the arrival of the authorization rule, authorization rules engine 304 validates the authorization rule by compiling the authorization rule in XSL processor 308. Once the authorization rule is compiled, XSL processor 308 produces a compiled rule object and stores the object in authorization rules engine 304. At this point, ADI data may be submitted for evaluation.

When user's application, application 300, requests access to a resource by submitting attribute values to authorization rules engine 304, authorization rules engine 304 gathers the ADI data required and builds an ADI XML input document. The ADI XML input document and the compiled XSL rule object are then presented to XSL processor 308 for evaluation. A result from a set of predetermined authorization decisions is returned by XSL processor 308 in a plain text format to application 300 after the evaluation. If any missing ADI data is present, an error message is returned to application 300 as well.

In the depicted example in FIG. 3, the same user creates rules and submits ADI data. Such an example is only for purposes of illustration and not meant to limit the manner in which these processes may be implemented. For example, a first user may generate the rules that are validated, while a second user submits ADI data for evaluation. This ADI data may already be formatted in an XML format. Alternatively, the ADI information may be received in a legacy form and may be converted into the appropriate format. The conversion may be performed in different components depending on the different implementation. For example, authorization rules engine 304 may perform the conversion from ADI data received from application 300.

Figure 4:
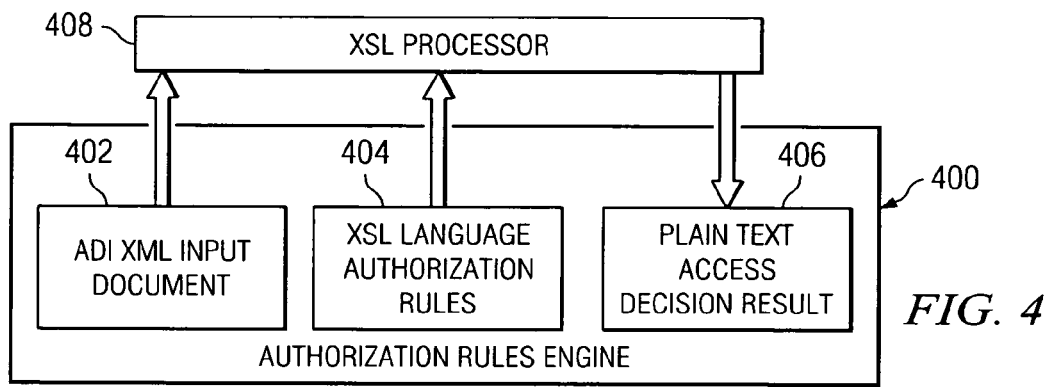
FIG. 4 is a diagram illustrating components used in the authorization rules engine of the present invention in accordance with a preferred embodiment of the present invention.

Turning next to FIG. 4, a diagram illustrating components used in the authorization rules engine of the present invention is depicted in accordance with a preferred embodiment of the present invention. As depicted in FIG. 4, authorization rules engine 400 includes ADI XML input document 402, XSL language authorization rules 404 and plain text access decision result 406. Authorization rules engine 400 implements the ADI XML document model of the present invention, which imposes constraints upon the format for XSL language authorization rule 404 by validating the authorization rule with XSL processor 408. XSL processor 408 may be implemented using any available XSL processor, such as IBM XSLT4C, which is available from International Business Machines Corporation.

Once XSL processor 408 validates XSL language authorization rules 404 a compiled rule object is generated. This resulting compiled rule object is stored in authorization rules engine 400. When a user submits attribute values to be evaluated to authorization rules engine 400, this component gathers the incoming data and inserts the data into ADI XML input document 402. Once authorization rules engine 400 builds ADI XML input document 402, both XSL language authorization rules 404 and ADI XML input document 402 are presented to XSL processor 408 for evaluation. As a result of the evaluation of XSL language authorization rules 404 and ADI XML input document 402, XSL processor 408 returns plain text access decision 406 to the user.

Figure 5:
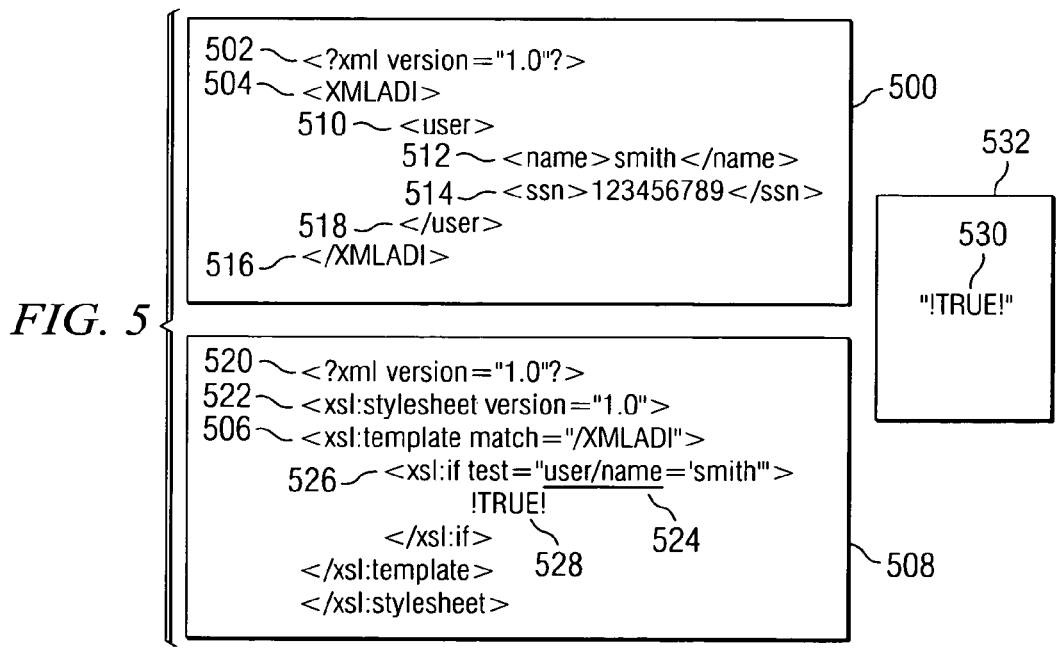
FIG. 5 is a diagram of detailed data used in an authorization rules engine in accordance with a preferred embodiment of the present invention.

Turning next to FIG. 5, a diagram of data used in an authorization rules engine is depicted in accordance with a preferred embodiment of the present invention. As depicted in FIG. 5, a detailed description of the data used in ADI XML input document 500 is an example of ADI XML input document 402 FIG. 4.

When the authorization rules engine builds ADI XML input document 500, declaration 502 is inserted at the beginning of the document. The ADI XML document model of the present invention enforces a custom element 504, named "XMLADI", to be inserted at the root after declaration 502. This element is referenced by the authorization rule's template match statement, statement 506 in XSL language authorization rules 508, when the authorization rule is validated in XSL language authorization rules 508. This statement is an example of a rule in XSL language authorization rules 404 in FIG. 4.

Next, the ADI data submitted by the user is inserted into the ADI XML input document 500. The first element of the input data is user element 510, which is represented by <user>in XML format. Within user element 510, name element 512, which represents a user's name, is inserted into the ADI XML input document 500. In this case the element <name>is in XML format. The value of name element 512 also is represented in ADI XML input document 500 as "smith". Next, ssn element 514, which represents the user's social security number, is inserted after name element 512 into ADI XML input document 500 within user element 510. The value of ssn element 514 is represented in ADI XML input document 500 as "123456789" in these examples. This ends the input ADI data submitted by the user to the authorization rules engine.

The closing tags 516 and 518 are inserted into the ADI XML input document 500 for custom element 508 and user element 510 root element respectively. The authorization rules engine satisfies the constraint of XSL/XML authorization rule model by enforcing all ADI data submitted to the authorization rules engine for evaluation to be in XML format before the rule evaluation takes place.

Also depicted in FIG. 5, a detailed description of the data used in XSL language authorization rules 404 in FIG. 4 is shown. From the detailed description of the data, declaration 520 of the XML document type is inserted at the beginning of XSL language authorization rule 508 to identify that XSL language authorization rule 508 is in an XML format. In this example, the XSL/XML authorization rule model of the present invention requires that XSL language authorization rule 508 to be a valid XSL stylesheet segment. Therefore, XSL stylesheet declaration 522 is inserted after XML declaration 520 to declare a XSL stylesheet segment. Declaration 522 satisfies part of the above requirement by enforcing XSL language authorization rule 508 to be a XSL stylesheet fragment.

Another constraint of the XSL/XML authorization rule model in the illustrated examples of the present invention is that XSL language authorization rule 508 contains a valid XSL template match statement 506, which matches the root of ADI XML input document 500 or a path below the root of ADI XML input document 500. As described above, the root of ADI XML input document 500 is custom element 504, which is "XMLADI". As a result, XSL template match statement 506 is inserted in XSL language authorization rule 508 with "/XMLADI" as a condition.

Alternatively, a path below the root can also be used, for example, "/XMLADI/user/name". However, if XSL language authorization rule 508 does not contain XSL template match statement 506, a statement is automatically added by the authorization rules engine with the root element "/XMLADI" attached.

In addition, the XSL/XML authorization rule model requires that XPath 524, contained in the XSL language authorization rule 508, cannot be absolute, unless the absolute path begins with the ADI XML input document root element "/XMLADI". Therefore, for example, XSL language authorization rule 508 may not contain "/user/name" because the absolute path has to begin with the root element "/XMLADI".

Furthermore, XSL language authorization rule 508 contains at least one reference to a valid ADI element, XPath 524, which is within the ADI XML input document 500. As shown in XSL language authorization rule 508, XSL if statement 526 is inserted such that this statement provides the condition upon which the input ADI data is evaluated. In this example, the condition is to test whether name element 512 within user element 510 is equal to value 'smith'. User element 510 is represented as "user/name" in XSL if statement 526 of the ADI XML input document 500. In this case, XSL language authorization rule 508 contains at least one reference to a valid ADI element, which is name element 512 under user element 510. The XPath in XSL if statement 526 is within the ADI XML input document 500. As a whole, this rule, XSL language authorization rule 502, references the ADI data that is within the confines of the ADI XML input document 500.

After a condition is provided in XSL if statement 526 of the XSL language authorization rule 508, the XSL/XML authorization rule model constrains XSL language authorization rule 508 even further by allowing XSL language authorization rule 508 to return only one of the three possible authorization results in these examples, plain text output 528 from the rule evaluation: "!TRUE!", "!FALSE!", or "!INDIFFERENT!". Result 528 in this example is "!TRUE!".

This result is result 530 in output 532. Plain text output 532 is an example of plain text access decision result 406 in FIG. 4. This result is returned to indicate the authorization rule evaluation permits access. "!FALSE!" indicates the authorization evaluation denies access. "!INDIFFERENT!" indicates the authorization rule evaluation has determined that it is not applicable to this access decision request and therefore can be ignored.

As a contingency in the illustrative examples, the XSL/XML authorization rule model automatically returns a "!FALSE!" if none of the above valid authorization results are returned. In addition, when the XSL processor returns plain text output 528, the XSL/XML authorization rule model requires the XSL Processor to return a plain-text UTF-8 or UTF-16 ASCII codeset in these examples.

Turning next to FIG. 6, a flowchart of a process for implementing an XSL/XML based authorization rules policy on a given set of data is depicted in accordance with a preferred embodiment of the present invention. The process illustrated in FIG. 6 may be implemented in an engine, such as authorization rules engine 400 in FIG. 4.

As depicted in FIG. 6, the process begins by initializing the authorization rules engine (step 600). Once the authorization rules engine is initialized, a data for request for access to an object for which an authorization rule applies may be received from a client application (step 602). Receipt of this data causes the XSL language authorization rule to be validated with the XSL processor (step 604). A determination is made as to whether the XSL authorization rule was successfully validated (step 606). If the XSL authorization rule is validated successfully, the resulting rule object from step 604 and the ADI data available are presented to the XSL processor for XSL language authorization rule evaluation (step 608). After the XSL processor generates the evaluation result, the output is returned to the calling application (step 610) with the process terminating thereafter. During the process of the evaluation, if an error is encountered due to insufficient ADI data, an error message is returned to the calling applications in step 610 and the process terminates thereafter.

Turning back to step 606, if the authorization rule was not successfully validated, an error is returned to the calling applications (step 612). The process terminates thereafter.

Next in FIG. 7, a flowchart of a process for initializing the authorization rules engine is depicted in accordance with a preferred embodiment of the present invention. The process shown in FIG. 7 is a more detailed description of step 600 in FIG. 6. This process may be implemented in a process in the authorization engine, such as the authorization rules engine 400 in FIG. 4.

As depicted in FIG. 7, the process begins when the user defined rules are received as an input in the authorization rules engine (step 700). The authorization rules engine queries the configuration of the XSL processor to verify whether the XSL processor returns a plain text codeset output (step 702).

A determination is made as to whether a plain text codeset is returned as an output (step 704). This step is employed to ensure that the XSL processor is able to return results in the required format. If the XSL processor is configured to return a plain text output, the process continues to validate the defined XSL language authorization rule (step 706), which is described in step 602 in FIG. 6. Otherwise, an error condition occurs and the authorization rules engine exits (step 708), with the process terminating thereafter.

Figure 8:
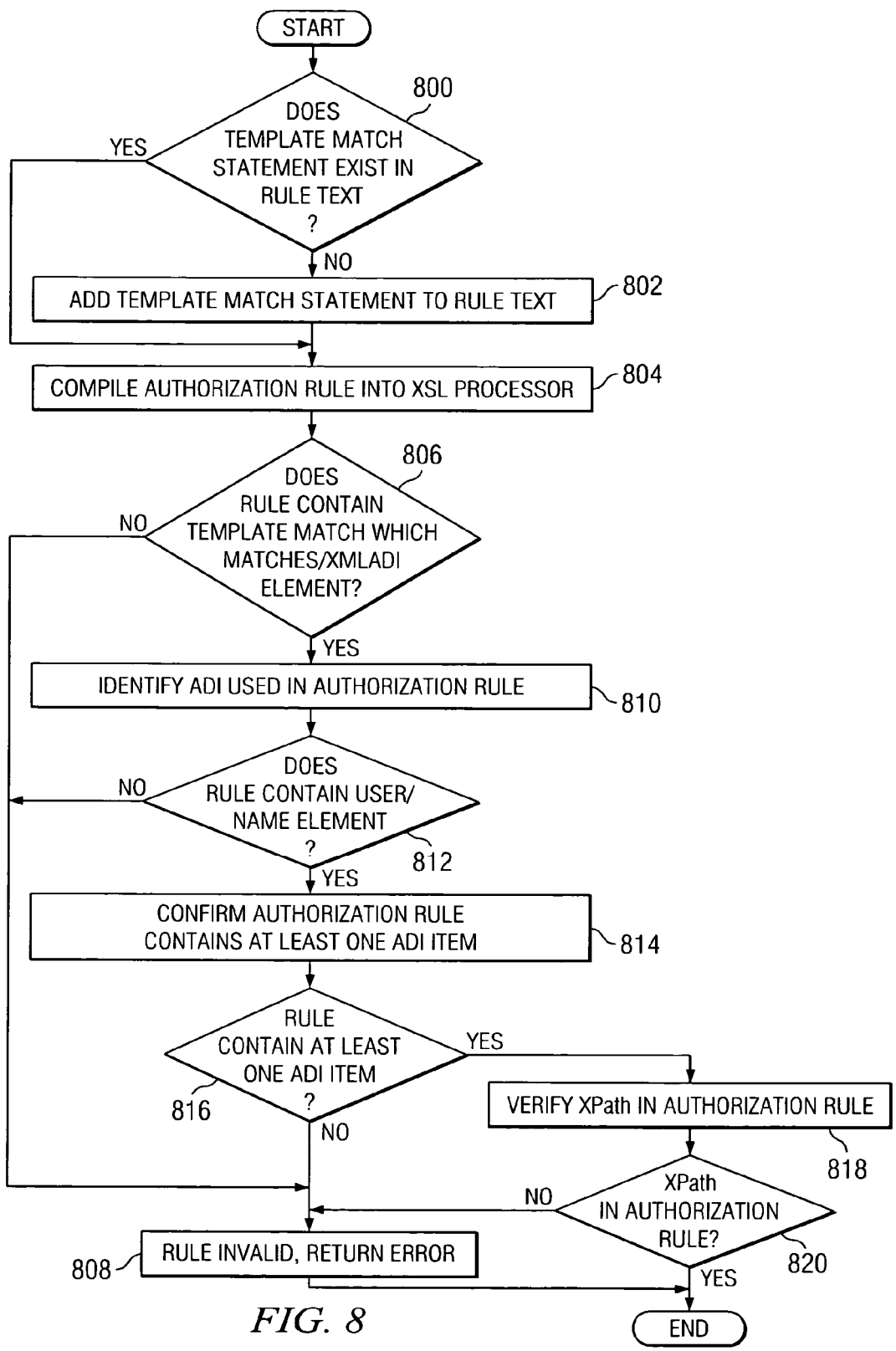
FIG. 8 is a flowchart of a process for validating the XSL language authorization rule in accordance with a preferred embodiment of the present invention.

Turning next to FIG. 8, a flowchart of a process for validating the XSL language authorization rule is depicted in accordance with a preferred embodiment of the present invention. The process shown in FIG. 8 is more detail description of step 602 in FIG. 6. This process may be implemented in a process in the authorization engine, such as the authorization rules engine 400 in FIG. 4.

The process begins by checking the text of the authorization rule for existence of an XSL template match statement in the rule text (step 800). If a template match statement is absent in the authorization rule, a statement with XPath "/XMLADI" is added by the authorization rules engine (step 802). When a valid template match statement is present, the authorization rule is then validated for the XSL statement correctness. The validation is performed by compiling the authorization rule into the XSL processor's compiled rule format (step 804).

A determination is made as to whether the rule contains a template match which matches a "/XMLADI" element (step 806). If a match is not present, the rule is invalid and an error is returned (step 808). On the other hand, if a match is present, the XSL processor returns a compiled rule object if the authorization rule is successfully compiled. The compiled rule object is then stored in the compiled rule cache of the authorization rules engine. The compiled rule object is a hierarchical syntax tree also called an opcode map, which contains the opcodes and operands of the XSL rule statement. This process satisfies the constraint of the XSL/XML authorization rule model by ensuring that the authorization rule is a valid XSL stylesheet fragment.

The process continues when the authorization rules engine utilizes the compiled rule object to identify a list of ADI data required in the authorization rule (step 810). The identification is accomplished by parsing the opcode map recursively to search for the XPath node name statement opcode and gather its operands. The list of ADI data required is returned with only the top-level element name in the XPath of the ADI. The granularity of the ADI data is restricted to the top-level element name to allow integration with external data provisional services that supply XML data to users. Since the external data provisional services only take request for the entire XML data packet, this makes it easier for the authorization rules engine to gather ADI data from the services. A determination is made as to whether the rule contains the user/name element (step 812).

If the user name/element is not present, the process proceeds to step 808 as described above. Otherwise, the authorization rule is confirmed to ensure that it contains a reference to at least one item of the ADI (step 814). The confirmation in step 814 is performed to satisfy the constraint of the XSL/XML authorization rule model of the present invention that the authorization rule must contain at least one valid ADI element. A determination is made as to whether at least one ADI item is present (step 816). If at least one ADI item is not present, the process proceeds to step 808 as previously described.

Otherwise, the XPath of the authorization rule is verified (step 810). This verification is performed to ensure that the authorization rule does not have absolute XPath names that reference the ADI except if the absolute path begins with the root element of the ADI XML input document, "/XMLADI". If the XPath is not in the authorization rule, the process proceeds to step 808. Otherwise, the process terminates if the XPath of the authorization rule is verified to be present.

Figure 9:
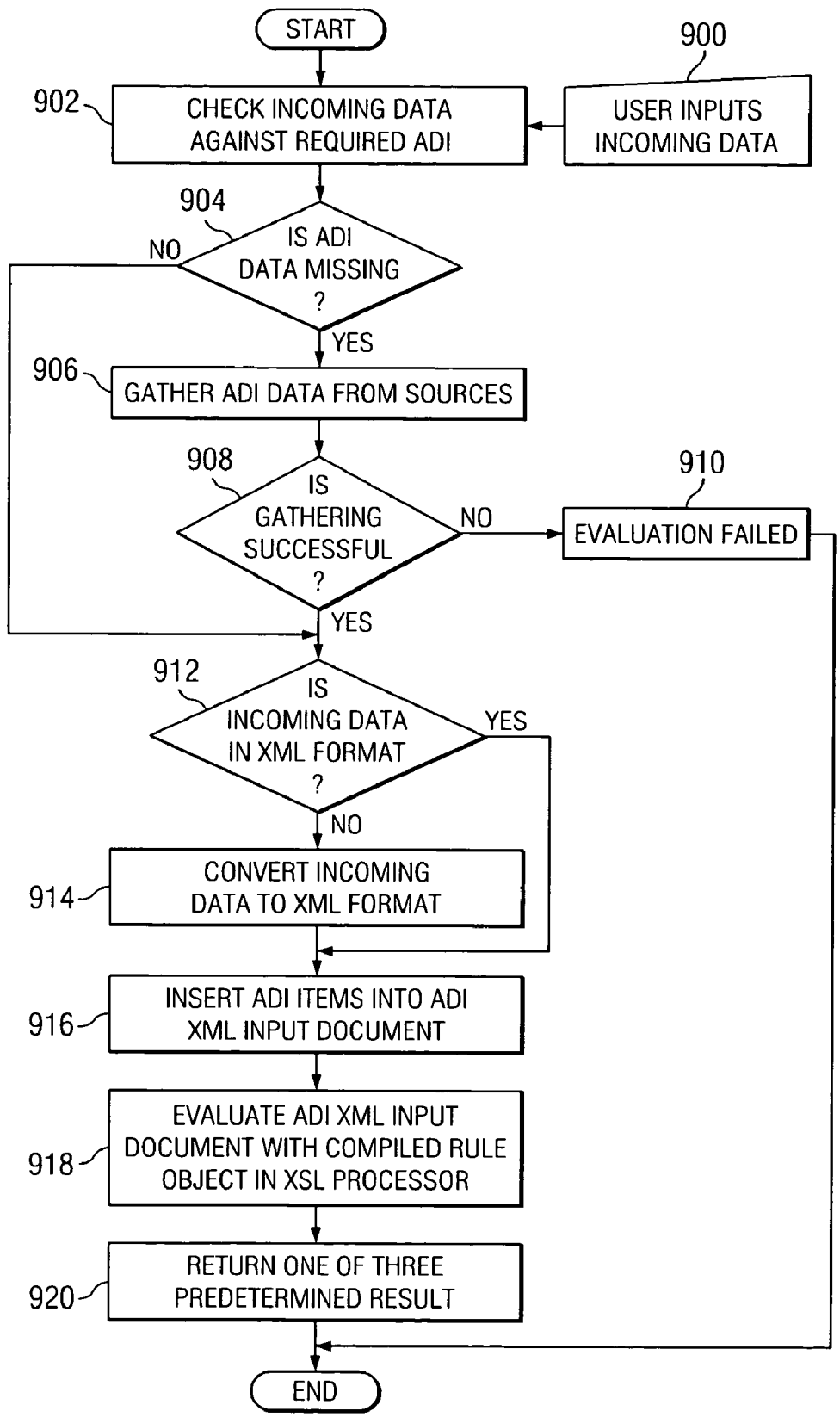
FIG. 9 is a flowchart of a process for evaluating the XSL language authorization rule in accordance with a preferred embodiment of the present invention.

Turning next to FIG. 9, a flowchart of a process for evaluating the XSL language authorization rule is depicted in accordance with a preferred embodiment of the present invention. The process shown in FIG. 9 is a more detailed description of step 604 in FIG. 6. This process may be implemented in a process in the authorization engine, such as the authorization engine 400 in FIG. 4.

As depicted in FIG. 9, the process begins when the user input, containing a set of incoming data, is received (step 900). When this input is received, the incoming data is checked against the set of ADI data required (step 902). This required ADI data is identified in step 806 in FIG. 8.

Next, a determination is made for missing ADI data (step 904). If the determination indicates ADI data is missing, the authorization rules engine attempts to gather the missing ADI data from one of the four places (step 906). The first place from which information may be gathered is the application context passed in by the entity that is requesting access decision. For example, the entity may be an application such as WebSphere, a product available from IBM Corporation, which passes a list of HTML headers to the authorization rules engine for evaluation. The second place from which information may be obtained is the credential attributes of the user, on whose behalf the request for access is being made. For example, attributes certificate context that is being held by the user for authorization, such as a credit card number.

Next, a third source of information is the context of the authorization rules engine itself. For example, internal data or protected object of the authorization rules engine. The last source is an external source that makes call to an API entitlement service configured by the calling application. For example, user may provide a plug-in service interface that requests ADI data. These four sources are provided as examples and other sources may be used in addition to or in place of these illustrations.

After searching the above four sources for missing ADI data, a determination is made on whether the gathering of ADI data was successful (step 908). If gathering of the ADI data is unsuccessful, the evaluation fails (step 910) and the process terminates thereafter. This failure generates an error message to be returned to the user that indicates insufficient ADI as described in step 606 in FIG. 6.

With reference again to step 908, if the gathering of ADI data is successful, a determination is made as to whether the incoming data is in XML format (step 912). If the incoming data is in a format other than XML, such as a string, unsigned long, or other legacy format, the authorization rules engine converts the incoming data to XML format automatically (step 914). This step causes all ADI data to be in XML format. Once all incoming data is in XML format, each ADI item is inserted into the ADI XML input document (step 916). After the ADI items are inserted to form the ADI XML input document, the resulting input document and the compiled rule object produced by the XSL processor in step 804 in FIG. 8 are passed to the XSL processor for evaluation (step 918).

When the XSL processor completes the evaluation, a plain text output is returned by the XSL processor with one of the predetermined decisions results (step 920) with the process terminating thereafter. If the result is one of the following text identifiers: "!TRUE!", "!FALSE!" or "!INDIFFERENT!", the authorization rules engine uses the text output of the XSL processor and coverts this output into an indication of access for the calling entity. However, if the result is one other the above text identifiers, a "!FALSE!" is returned to the calling entity. The result is returned as described in step 606 in FIG. 6.

Thus, the present invention provides an improved method, apparatus, and computer instructions for performing XSL/XML based authorization for accessing resources. The mechanism of the present invention solves the problem of implementing authorization rules policy on incoming legacy data that is currently not in an XML format, by providing a mechanism that converts legacy formats into XML format. This mechanism enables the authorization rules engine to adapt to new applications that employs XML data formats and protocols. In addition, the mechanism of the present invention allows ADI data required for evaluation to be gathered "on the fly" by using the compiled rule object that is produced when the authorization rule is validated. A list of data required for evaluation is generated when the rule is validated; and the authorization rules engine gathers the required ADI data at evaluation time according to the list.

In this manner, using the innovative features of the present invention, the administrator is not required to understand the syntax of the rules, nor does the administrator need to understand the limitations of the variables used in the implementation. Moreover, when confronted with new XML standard based business data such as ebXML, the mechanism of the present invention accommodates the new data by employing this innovative XSL/XML based authorization rule model to handle the new data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for controlling access to a resource, the method comprising:

receiving access decision information from a client in a format other than in an extensible markup language format, wherein the access decision information is usable for the controlling of the access to the resource;

formatting the access decision information into an access decision information document in the extensible markup language format;

evaluating the access decision information document in an extensible markup language format with an extensible markup language rule, wherein the evaluating step uses two different extensible markup language entities as input to its evaluation process, which are (i) the access decision information document in the extensible markup language format and (ii) the extensible markup language rule, wherein the extensible markup language rule is in a compiled rule object compiled by an extensible markup language processor and identifies the access decision information; and generating an access decision based on the evaluation.

2. The method of claim 1, wherein the access decision is in a plain text format.

3. The method of claim 1, wherein the access decision is one of true, false, or indifferent.

4. The method of claim 1, wherein the extensible markup language rule references at least one valid element within the access decision information.

5. The method of claim 1, wherein the extensible markup language rule is a valid extensible stylesheet fragment.

6. The method of claim 5, wherein the extensible markup language rule is validated as the valid extensible stylesheet fragment by an extensible markup language processor prior to the evaluating step.

7. The method of claim 1, wherein the evaluating step includes:

determining whether the access decision information document includes all required data; and attempting to gather missing data if any of the required data is missing.

8. An authorization system comprising:

a set of extensible markup language rule objects; and an extensible markup language processor, wherein the extensible markup language processor receives access decision information from a client in a format other than in an extensible markup language format, wherein the access decision information is usable for controlling access to a resource, formats the access decision information into an access decision information document in the extensible markup language format , evaluates the access decision information document in the extensible markup language format against a rule object in the set of extensible markup language rule objects, wherein the extensible markup language processor has two different extensible markup language entities as input, which are (i) the access decision information document in the extensible markup language format and (ii) the rule object in the set of extensible markup language rule objects, wherein the extensible markup language rule is in a compiled rule object compiled by an extensible markup language processor and identifies the access decision information, and generates a plain-text result of an access decision based on the evaluation.

9. A data processing system for controlling access to a resource, the data processing system comprising:

receiving means for receiving access decision information from a client in a format other than in an extensible markup language format, wherein the access decision information is usable for the controlling of the access to the resource;

formatting means for formatting the access decision information into the access decision information document in the extensible markup language format;

evaluating means for evaluating the access decision information document in an extensible markup language format with an extensible markup language rule, wherein the evaluation means has two different extensible markup language entities as input, which are (i) the access decision information document in the extensible markup language format and (ii) the extensible markup language rule, wherein the extensible markup language rule is in a compiled rule object compiled by an extensible markup language processor and identifies the access decision information; and generating means for generating an access decision based on the evaluation.

10. The data processing system of claim 9, wherein the access decision is in a plain text format.

11. The data processing system of claim 9, wherein the access decision is one of true, false, or indifferent.

12. The data processing system of claim 9, wherein the extensible markup language rule references at least one valid element within the access decision information.

13. A computer program product in a computer readable storage medium for controlling access to a resource, the computer program product comprising:

first instructions for receiving access decision information from a client in a format other than in an extensible markup language format, wherein the access decision information is usable for the controlling of the access to the resource;

second instructions for formatting the access decision information into the access decision information document in the extensible markup language format;

third instructions for evaluating the access decision information document in an extensible markup language format with an extensible markup language rule, wherein the second instructions for evaluating uses two different extensible markup language entities as input, which are (i) the access decision information document in the extensible markup language format and (ii) the extensible markup language rule, wherein the extensible markup language rule is in a compiled rule object compiled by an extensible markup language processor and identifies the access decision information; and fourth instructions for generating an access decision based on the evaluation.

14. The computer program product in the computer readable storage medium of claim 13, wherein the access decision is in a plain text format.

15. The computer program product in the computer readable storage medium of claim 13, wherein the access decision is one of true, false, or indifferent.

16. The computer program product in the computer readable storage medium of claim 13, wherein the extensible markup language rule references at least one valid element within the access decision information.

17. The computer program product in the computer readable storage medium of claim 13, wherein the extensible markup language rule is a valid extensible stylesheet fragment.

18. The computer program product in the computer readable storage medium of claim 17, wherein the extensible markup language rule is validated as the valid extensible stylesheet fragment by an extensible markup language processor and the second instructions for evaluating are responsive to such validation by the extensible markup language processor.

19. The computer program product in the computer readable storage medium of claim 13, wherein the evaluating step includes:

fifth instructions for determining whether the access decision information document includes all required data; and sixth instructions for attempting to gather missing data if any of the required data is missing.

20. A data processing system comprising:

a bus system;

a memory connected to the bus system, wherein the memory includes a set of instructions; and a processing unit connected to the bus system, wherein the processing unit executes the set of instructions to receive access decision information from a client in a format other than in an extensible markup language format, wherein the access decision information is usable for controlling access to a resource, format the access decision information into an access decision information document in the extensible markup language format; evaluate the access decision information document in an extensible markup language format with an extensible markup language rule, wherein the processing unit uses two different extensible markup language entities as input, which are (i) the access decision information document in the extensible markup language format and (ii) the extensible markup language rule, wherein the extensible markup language rule is in a compiled rule object compiled by an extensible markup language processor and identifies the access decision information; and generate an access decision based on the evaluation.

* * * * *